(12) United States Patent
Barnett et al.

(10) Patent No.: US 8,046,305 B1
(45) Date of Patent: Oct. 25, 2011

(54) GATEWAY TO TRANSACTION PROCESSING NETWORK

(75) Inventors: Timothy Barnett, Roswell, GA (US); John Galloway, Duluth, GA (US)

(73) Assignee: Elavon, Inc., Atlanta, GA (US)

( * ) Notice: Subject to any disclaimer, the term of this patent is extended or adjusted under 35 U.S.C. 154(b) by 1826 days.

(21) Appl. No.: 09/404,463

(22) Filed: Sep. 24, 1999

(51) Int. Cl.
*G06F 17/00* (2006.01)

(52) U.S. Cl. ........... 705/78; 709/217; 709/203; 709/219

(58) Field of Classification Search ............... 705/78, 705/15; 709/217
See application file for complete search history.

(56) References Cited

U.S. PATENT DOCUMENTS

| | | | |
|---|---|---|---|
| 5,677,955 A | 10/1997 | Doggett et al. | |
| 5,794,234 A | 8/1998 | Church et al. | |
| 5,903,652 A * | 5/1999 | Mital | 705/26 |
| 5,933,812 A | 8/1999 | Meyer et al. | |
| 5,978,840 A | 11/1999 | Nguyen et al. | |
| 5,987,132 A * | 11/1999 | Rowney | 705/26 |
| 6,018,724 A | 1/2000 | Arent | |
| 6,029,150 A | 2/2000 | Kravitz | |
| 6,072,870 A * | 6/2000 | Nguyen et al. | 705/26 |
| 6,373,950 B1 * | 4/2002 | Rowney | 705/26 |

OTHER PUBLICATIONS

VirtualNet Implementation Guide Vital VirtualNet Internet Gateway for Payment Processing, Vital Processing Services® (Vital™), LLC, Jun. 17, 1999.

\* cited by examiner

*Primary Examiner* — Calvin L Hewitt, II
*Assistant Examiner* — John M Winter
(74) *Attorney, Agent, or Firm* — McKenna Long & Aldridge LLP

(57) ABSTRACT

A method and apparatus for processing credit card transactions over the Internet includes an application program interface (API) that converts a simple ASCII transaction message from the merchant to the message spec required by the transaction processor. The API also encrypts the transaction message so that the transaction is secure over the Internet and manages the message traffic between the merchant and transaction processor. In a second preferred embodiment, a merchant sends a simple ASCII transaction message via a SSL (secure sockets layer) Internet connection. In preferred embodiments, redundant connections are set up between the merchant and the transaction processor, allowing a transaction to continue being processed if one of the connections fails.

14 Claims, 6 Drawing Sheets

| Context# | Interface# | IP Address | In Time | Out Time | Create Time |
|---|---|---|---|---|---|
| 1 | 3 | 100.1.14.130, 1052 | 9/7/99 7:30:52 AM | 9/7/99 7:30:52 AM | 9/7/99 7:28:10 AM |
| 2 | 4 | 100.1.14.130, 1058 | 9/7/99 7:30:56 AM | 9/7/99 7:30:56 AM | 9/7/99 7:28:31 AM |
| 3 | 5 | 100.1.14.130, 1064 | 9/7/99 7:31:01 AM | 9/7/99 7:31:01 AM | 9/7/99 7:28:44 AM |
| 4 | 6 | 100.1.14.130, 1070 | 9/7/99 7:31:05 AM | 9/7/99 7:31:05 AM | 9/7/99 7:28:53 AM |
| 5 | 7 | 100.1.14.130, 1076 | 9/7/99 7:31:10 AM | 9/7/99 7:31:10 AM | 9/7/99 7:29:02 AM |
| 6 | 8 | 100.1.14.130, 1082 | 9/7/99 7:31:14 AM | 9/7/99 7:31:14 AM | 9/7/99 7:29:13 AM |
| 7 | 9 | 100.1.14.130, 1088 | 9/7/99 7:31:18 AM | 9/7/99 7:31:19 AM | 9/7/99 7:29:23 AM |
| 8 | 10 | 100.1.14.130, 1094 | 9/7/99 7:31:23 AM | 9/7/99 7:31:23 AM | 9/7/99 7:29:32 AM |
| 9 | 11 | 100.1.14.130, 1100 | 9/7/99 7:31:30 AM | 9/7/99 7:31:30 AM | 9/7/99 7:29:43 AM |
| 10 | 12 | 100.1.14.130, 1106 | 9/7/99 7:31:36 AM | 9/7/99 7:31:37 AM | 9/7/99 7:29:51 AM |
| 11 | 13 | 100.1.14.130, 1112 | 9/7/99 7:31:42 AM | 9/7/99 7:31:42 AM | 9/7/99 7:30:01 AM |

GATEWAY TO TRANSACTION PROCESSING NETWORK

BACKGROUND OF THE INVENTION

1. Field of the Invention

This invention pertains generally to the field of electronic payment processing, and more particularly to improved gateways through which transaction processing networks can be reached.

2. Related Art

There are primarily two ways for a merchant to get credit card transaction data to a transaction processor (either a bank computer or a third party aggregator): dial-up or leased line. The dial-up world is well established and offers the quickest out-of-the-box solution. Merchants purchase or lease a point-of-sale (POS) terminal such as those sold by VERIFONE and dial a 1-800 number for transaction processing. Recently, personal computers (PCs) have made inroads into this area by making available enhanced capabilities and functions. However, such PC-based terminals are still limited to "dial-up" connectivity to a processor's network—thus forcing them to emulate a POS terminal.

The second option for a merchant wishing to process credit card transactions is to lease a dedicated circuit into the transaction processor's network. Such a lease may cost between $500 and $800 per month or more, depending upon the telecommunications carrier. This option requires a merchant to obtain the message specification (the "message spec") from the transaction processor, write and update custom software to adhere to the message spec, and certify their custom code on the processor's network. This can be time consuming and expensive, but some merchants are willing to go through this effort for two reasons. First, it allows them to develop a custom solution to fit their individual needs. Second, the typical transaction time is reduced to 3-4 seconds because the set-up time associated with 'modem training' is eliminated.

What is needed is a solution that combines the strengths and eliminates the weaknesses of these two options. More specifically, what is needed is a method and apparatus for processing credit card transactions that eliminates the delay associated with 'modem training' without requiring the expense associated with a dedicated circuit connecting a merchant to a transaction processor and/or writing software to conform to a transaction processor's message spec.

SUMMARY OF THE INVENTION

The present inventions meet the aforementioned need to a great extent by providing an apparatus and method for processing credit card transactions over the Internet. Using the Internet reduces the cost associated with credit card transaction processing because most merchants either already have an Internet connection or can establish access via an Internet service provider (ISP) at low relatively low cost as compared to a leased line. In one preferred embodiment, a gateway comprising an application program interface (API) is integrated into a merchant's system. The gateway may comprise a separate physical device on the merchant's network, or may comprise software that is integrated into the merchant's existing code, or may comprise a remote computer reachable via the public switched telephone network. The API accepts a simple ASCII transaction message from the merchant and converts it to the message spec required by the transaction processor. The API also encrypts the transaction message so that the transaction is secure over the Internet and manages the message traffic between the merchant and transaction processor. In a second preferred embodiment, a merchant sends a simple ASCII transaction message to the gateway, which then translates the message to the required message spec and encrypts the transactions. In preferred embodiments, redundant connections are set up between the merchant and the transaction processor, allowing transactions to continue being processed if one of the connections fails.

BRIEF DESCRIPTION OF THE DRAWINGS

The foregoing and other features and advantages of the inventions will be more readily understood with reference to the following drawings in which.

DETAILED DESCRIPTION

The present invention will be discussed with reference to preferred embodiments of gateways to transaction processing networks. Specific details, such as the format of messages, types of hardware, etc., are set forth in order to provide a thorough understanding of the present invention. The preferred embodiments discussed herein should not be understood to limit the invention.

Figure 1:
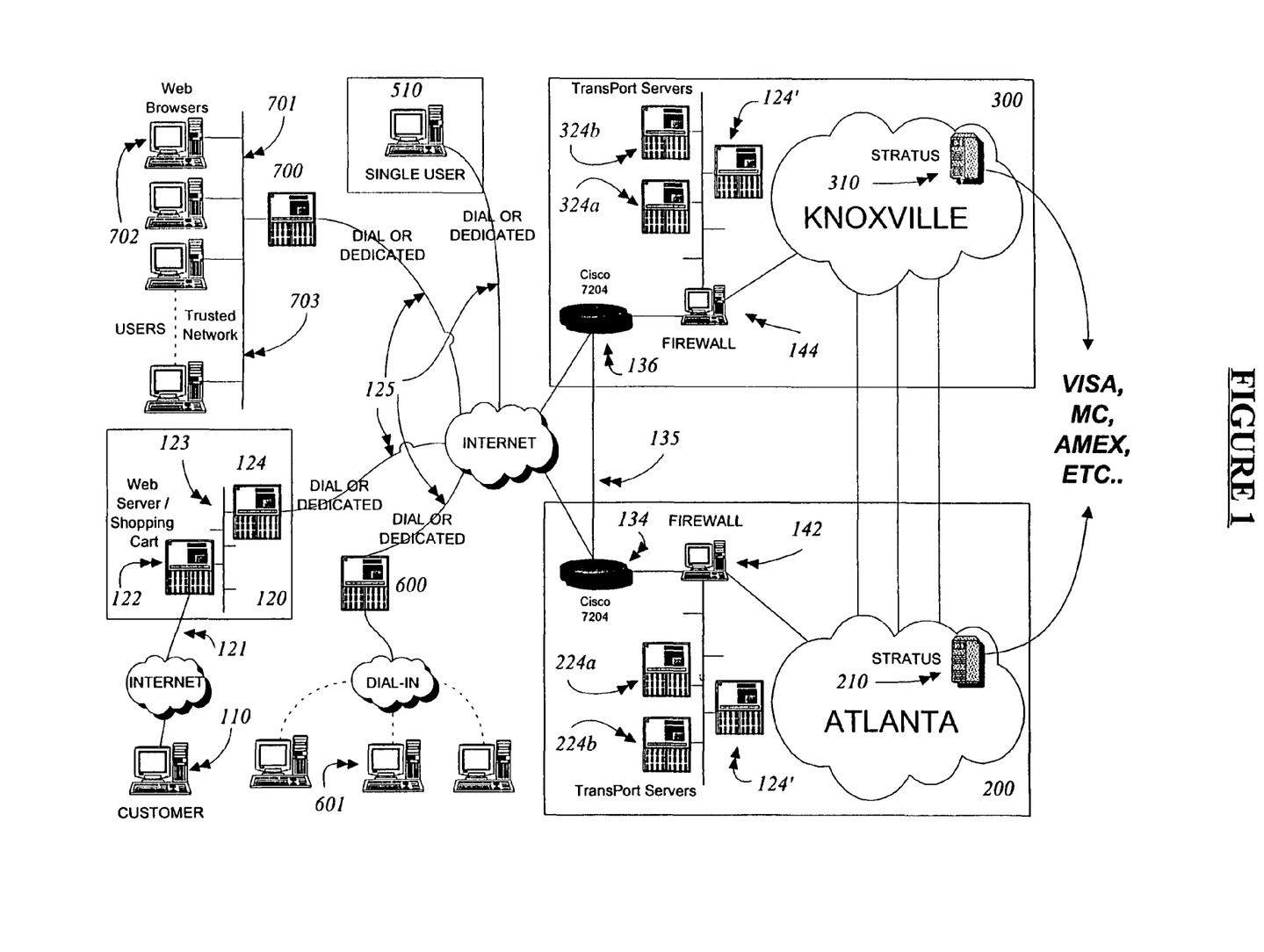
FIG. 1 is a hardware block diagram of a transaction processing system with a gateway integrated into a merchant's network, a remote gateway reachable via the public switch telephone network, a single user gateway and a multiple-terminal merchant network including a gateway according to preferred embodiments of the present inventions.

A block diagram of a preferred embodiment of a transaction processing system 100 is illustrated in FIG. 1. In the system 100, a customer computer 110 is connected to a merchant computer 122 through an Internet connection 121. As used herein, a "merchant computer" is a computer having promotional and/or catalog materials thereon. Merchant computers may be owned by a merchant and/or be physically present at the merchant's premises, or may comprise a remote third party host computer. The merchant computer 122 forms part of the merchant system 120. The customer computer 110 views the promotional materials (e.g., on-line catalogs, etc.) from the merchant computer 122. If the customer indicates a desire to purchase a product or service promoted by the merchant computer 122, the merchant computer 122 initiates a payment transaction.

It should be noted that the present invention is not limited to sales based on Internet advertising. Traditional retail transactions are also supported. In such a case, the customer computer 110 and the Internet link 121 to the merchant computer 122 are not necessary; instead, the merchant computer 122 may be linked to point-of-sale credit card readers (not shown in FIG. 1), from which payment information is obtained. Other types of sales, such as telemarketing (in which the merchant computer receives credit card information from operators who key in credit card information received from a customer) are also supported.

The merchant computer 122 initiates a transaction by sending a transaction message to application software on the transaction gateway computer 124 via the merchant's network 123. In preferred embodiments, the message sent by the merchant computer 122 to the transaction gateway computer 124 is in unencrypted ASCII form. An example of such a message is provided below:

$123.94
1234 5678 9123 4567 0199
12345679
12345

In the above example, the first line of the message represents the amount, $123.94. The second number represents the credit card number, with the last four digits representing the month (01=January) and the year (1999) of expiration for the credit card. The third number represents the merchant identification number, and the fourth number represents the terminal identification number.

The above message may be sent from the merchant computer 122 to the transaction gateway computer 124 in an unencrypted form because the merchant computer 122 and the transaction gateway computer 124 share the same physical network 123. In a preferred embodiment, the network 123 supports TCP/IP. To initiate a transaction, the merchant computer 122 simply opens a socket to the transaction gateway computer 124, sends the above-described ASCII message, listens for a response on the same socket, and closes the socket once the message has been sent.

The use of a separate transaction gateway computer 124 allows the merchant computer 122 to use a different operating system than that used by the transaction gateway computer 124. The ability to tolerate operating system differences is important to those merchants having investments in existing software that they would like to integrate with the transaction gateway. However, it is also possible for both the merchant application and the transaction gateway API to run on the same physical device as discussed further below.

Upon receipt of the ASCII transaction message from the merchant computer 122, the transaction gateway computer 124 translates the message from the ASCII format in which it is received into the message spec required by the transaction processor. Once the message has been translated, the transaction gateway computer 124 issues simultaneous connection requests via Internet connection 125 to each of two externally reachable servers 224*a,b* and 324*a,b*, which are connected to server farms 200, 300. It is possible to have more than two farms 200, 300. The farms 200, 300 are in geographically remote locations so that physical anomalies (e.g. communications lines breakages, long distance carrier problems, etc.) at one location will not have an impact at the other locations. Geographically remote as used herein means at least in separate buildings, more preferably in locations served by different telephone company exchanges; more preferably in locations having different area codes; and even more preferably still in locations served by different "bell company" local telephone service providers.

When an externally reachable server 224*a,b*, 324*a,b* from each server farm 200, 300 replies to the connection request, the transaction gateway computer 124 establishes a client/server socket connection to the responding server 224, 324 via the corresponding router 134, 136. Whichever socket is established first becomes the default gateway/path for the session. The second socket is used for backup/redundancy. If at some point the default socket fails, pending transactions are immediately sent by the gateway through the second socket to the backup server.

As soon as the socket is established, it is encrypted through public and private key exchanges between the transaction gateway computer 124 and the servers 224, 324(*a,b*). Every socket that is set up has a unique key pair. Because the keys for each socket are unique, intermixing transactions at the transport level is impossible. Also, since public and private key exchange is used in the key exchange, there is no "master" key that can be compromised and exploited—thus, security is enhanced. In a preferred embodiment, the keys are generated using commercially available crypto-engines such as engine available from Microsoft under license from RSA. It is also preferable to support both domestic 128 bit keys as well as the exportable 40 bit keys. If the 128 bit key is available, it will be used first. If not, the API searches for the 40 bit key. This is done to accommodate U.S. dollar transactions originating overseas from locations such as U.S. military bases. As higher strength keys are introduced (e.g., 256 or 512 bit keys), they can easily be incorporated. If no key is present, the socket setup will fail and the socket connection be broken so that there is no chance of passing unencrypted credit card information over the Internet.

When the transaction message has been received by a server 224, 324 from the transaction gateway computer 124, the server sends the transaction request to a transaction host 210, 310, which in turn switch the transaction to a bank computer (indicated as VISA, MC, AMEX, ETC. in FIG. 1). The bank computer sends its reply to the server 210, 310, which then passes the response to the externally reachable server to 224*a,b*, 324*a,b*. The reply is then sent along a reverse path to the merchant computer 124 to complete the transaction.

After a transaction has completed, the gateway computer 124 keeps both sockets "alive" for approximately 5 min. by sending keep-alive messages over the socket at 30 sec. intervals. If no new transaction message is received from the merchant computer 122 in this interval, the API closes the sockets. If a socket has remained open for 24 hours, the gateway computer 124 automatically issues a new key request and exchanges the new key with the server 224, 324 to maintain socket security.

The gateway computer 124 can support two types of transaction processing, both Host Capture and Terminal based. The chief difference between the modes is how they handle the settlement process. Host Capture is the easiest to implement and the best choice for those replacing a leased line with the gateway computer 124 and selling goods in the traditional retail environment in which the goods or services have been delivered to the customer so that the merchant is allowed to "settle" the transaction. In this mode, the transaction processor will retain a copy of the transaction and settle the transaction on behalf of the merchant automatically without any further intervention by the merchant computer 122.

The other mode of operation, Terminal based, operates the same as Host Capture except that the merchant initiates settlement of the transaction. In this mode, the transaction processor passed the authorization response back to the merchant computer 122 and does not store the transaction for automatic settlement. This mode is most applicable for merchants selling goods on the Internet where future delivery/shipment of goods is commonplace. Since VISA and MasterCard regulations stipulate that a cardholder may not be charged until the merchant has shipped or delivered the goods, most Internet merchants must operate in this mode—otherwise they have opened themselves up for possible consumer "chargebacks". The following modes and commands are supported via the gateway computer 124:

| Host Capture | Terminal |
| --- | --- |
| Auth Only | Auth Only |
| AVS Only | AVS Only |
| Sale | Sale |
| Credit | Settlement |
| Force | And within settlement one can issue a: |
| Void Batch or item in Batch | Credit |
| Clear Batch | Force |
| Manually initiate settlement | Void |

Although not shown on FIG. 1, frame relay routers are also included outside the firewall 142, 144 on each of the server farms 200, 300. These routers are present to accommodate existing customers who wish to continue using existing frame relay connections. FIG. 1 also illustrates a dedicated, point-to-point T1 connection 135 between the Internet routers 134, 136 (there is also a dedicated frame relay connection, not shown in FIG. 1, between the frame relay routers on each of the farms 200, 300). These dedicated connections 135 are provided to handle a situation in which one of the firewalls 142, 144 are down. Because the dedicated connections 135 are "upstream" of the firewalls 142, 144, a transaction intended to pass through one firewall may be routed through the other firewall when the intended firewall is down.

Figure 2:
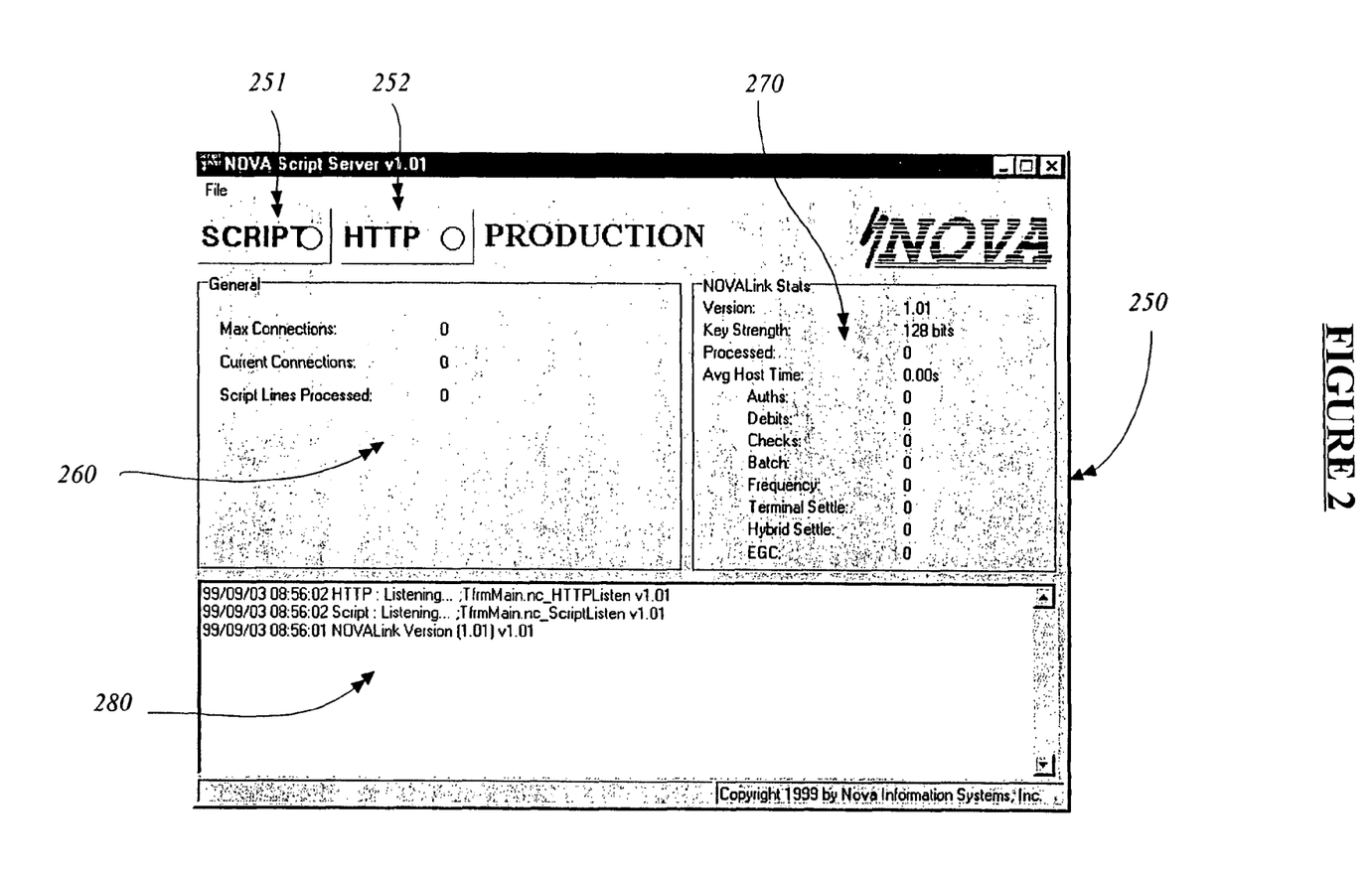
FIG. 2 is a drawing of a main display window according to a preferred embodiment of the present invention.

In addition to performing the functions described above, the transaction gateway computer 124 also provides the user with an interface through which traffic between the merchant computer 122, transaction gateway computer 124 and servers 24, 324 may be monitored. FIG. 2 illustrates the main screen 250 presented on the gateway computer 124.

The two indicators in the upper left corner of the screen 250, the script indicator 251 and HTTP indicator 252, change to green when there is a connection to the server via that protocol. The script interface should be thought of as the "transactional" one and the HTTP interface as the "informational" one. An explanation of the contents of the general window 260, the link stats window 270 and the event display window 280 of screen 250 follows below.

The general window 260 displays the following:

Max Connections The maximum number of connections that have been established to the gateway computer 124 from the merchant computer 122.

Current Connections: Number of open connections between the gateway computer 124 and the merchant computer 122.

Script Lines Processed: The actual number of lines ASCII text that have been processed by the gateway computer 124.

The link stats window 270 displays the following:

Version: Version release of gateway computer API software.

Key Strength Indicates either 128-bit (U.S. Domestic) or 40-bit (exportable).

Processed: Number of total transactions processed of all types—auth, settle, etc.

Avg Host Time: The average transaction time for switching the transaction from the gateway computer 124 server, through the Internet, through the transaction processing network, to the remote network (VISA, MasterCard, Amex, etc.), back though the transaction processing network, back through the Internet, and back again to the gateway computer 124.

Auths: Number of credit card authorizations (VISA, MasterCard, Amex, Discover, etc.) processed.

Debits: Number of debit transactions processed.

Checks: Number of check verifications that have been switched out to SCAN.

Batch: There are three types of "batch" transactions available when one is configured for Host Capture processing; this is a summary counter for all three. One has the ability to clear an open batch (that is delete it), view the "totals" for an open batch for each transaction type (VISA, MC, Amex . . . ), and view the "totals" for a previous batch.

Frequency: Number of "frequency" transactions (a unique to one transaction processor, NOVA Corporation loyalty product) that have been processed.

Terminal Settle: Number of Terminal Based settlement transactions that have been processed.

Hybrid Settle: If set up to uses Hybrid (host capture/auto close), one has the ability to manually initiate the settlement of one's batch file. This counts the number of terminal based settlements initiated from the merchant.

EGC: Number of Electronic Gift Certificates or Electronic Cash Rebates that have been processed.

The event display window 280 displays only high level events that occur within the operation of gateway computer 124. This window shows that version 1.01 of the software is running, and that both the Script interface and the HTTP interface are listening for connections.

As mentioned previously, it is possible for the gateway API software to run on the same computer as the merchant's software. The gateway API software may also run on a computer running other applications. In order to accommodate multiple applications on a single computer, the gateway API allows the user to configure the ports on which the gateway API operates via a configuration window 350, shown in FIG. 3. By default, the Script Port listens on port 8101 for connections while the HTTP Port listens on port 80. Since both of these are configurable (by entering the desired port assignments in the respective dialog boxes 351, 352, the user may customize the installation to their specific needs and not "conflict" with other applications that may be running on the same host. For example, if the gateway API is installed on a server that is also running Microsoft's Internet Information Server (IIS), IIS will also be "listening" on port 80 for HTTP connections. In this case, the user can configure the gateway API HTTP interface to listen on an alternate port (port 81, for example) so as not to conflict with IIS. The "Debug Mode" (check box 353) is not intended to be used in an operational environment and will not be described further herein.

Figure 3:
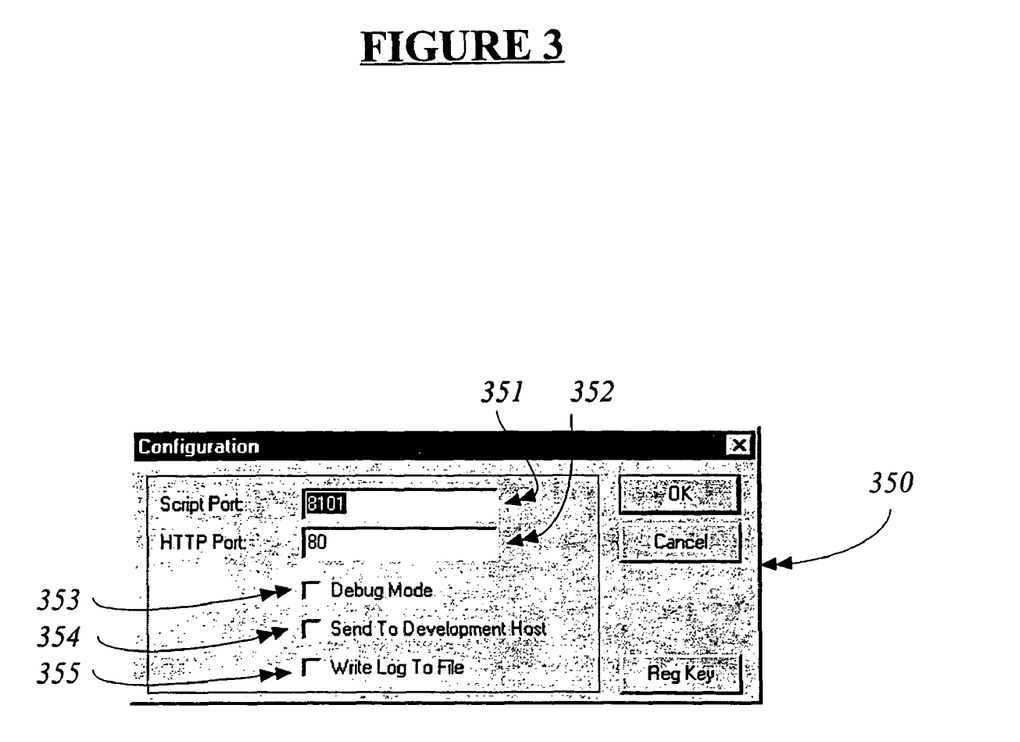
FIG. 3 is a drawing of a configuration window according to a preferred embodiment of the present invention.

The "Write Log to File" option (check box 35) is a "higher level" debugging tool. When this option is selected, anything that appears in the event display window 280 of the main screen 250 will be written to a file located in a subdirectory on the computer on which the gateway API is running. The file name will be the type YYYYMMDD.LOG (where YYYY=the year, MM=the month and 00=the day of the month). Lastly, there is a check box 355 entitled "Send To Development Host," that works in connection with the "Reg Key" button 356. By default, the gateway API is configured to send transaction to a transaction processor's development systems. This is done to ensure that all users of gateway API go through the transaction processor's certification process prior to going into "production." Once this certification has been completed, the user of the gateway API will be sent a 22 digit alphanumeric Registration Key that will enable the gateway API to be used for production traffic. Without the key, traffic will only flow to the development systems. This protects the transaction processor from improper or unauthorized use of the gateway API and also enables the merchant to integrate the gateway API into their environment and perform testing without the worry of accidently sending transactions to a credit card bank.

Figure 4:
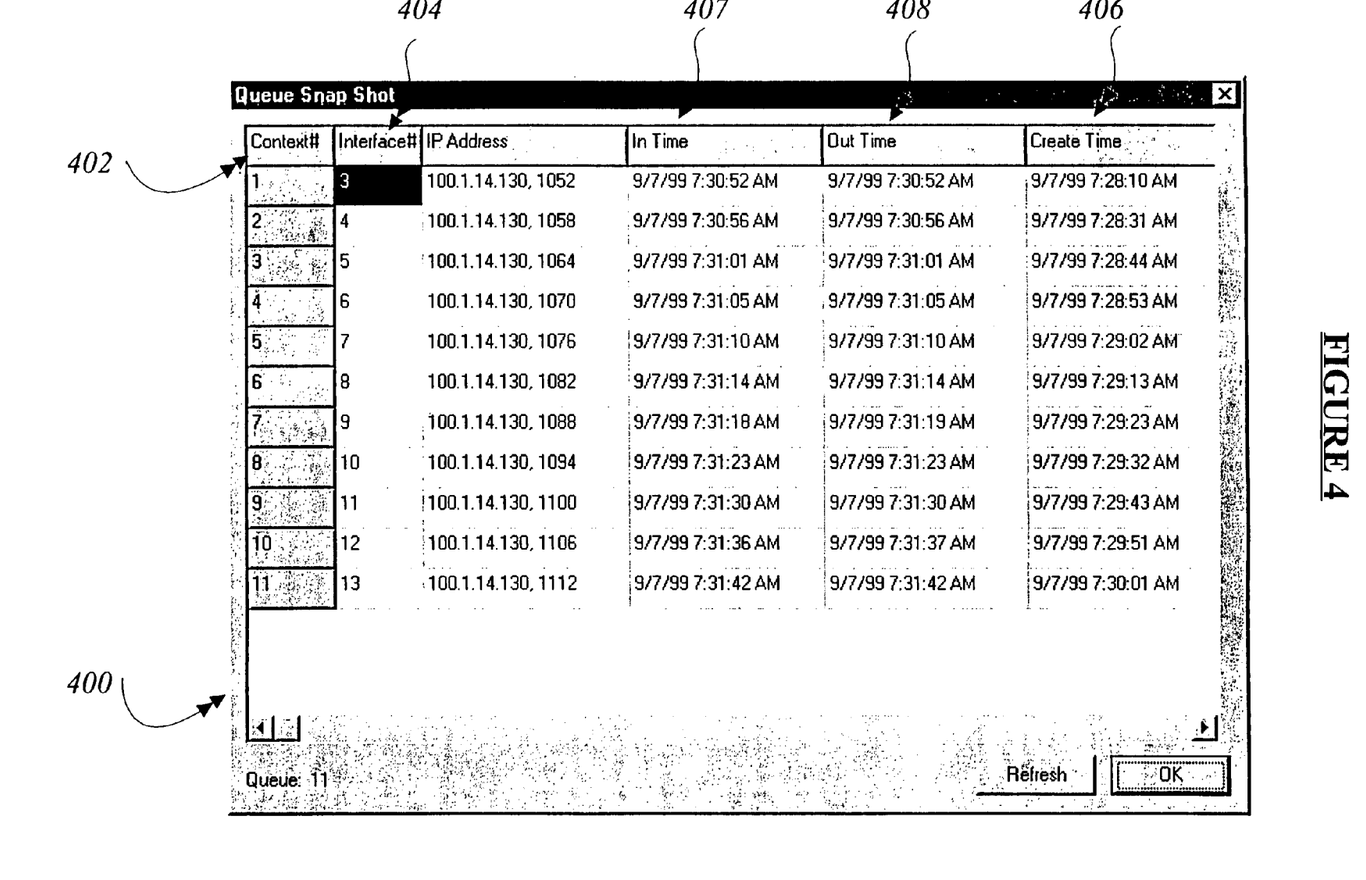
FIG. 4 is a drawing of a snap shot window according to a preferred embodiment of the present invention.

Also available is a "SnapShot" window 400, shown in FIG. 4, that displays all open connections to the gateway API. The purpose of the "SnapShot" window 400 is to give the system administrator of the gateway API the ability to view open connections to the gateway API at any "SnapShot" in time. By default, the "SnapShot" is sorted by source IP address and socket for display. The "Context #" field 402 is a rolling transaction counter for that socket. They will increment from 1 to 655335 and then wrap back to 1. Every time a remote server calls gateway API "create_context" command, a new "context" and socket is assigned. The "Interface #" field 404 is another counter that shows the logical interface number and the order that each socket was assigned. The "Create Time" field 406 is the system time that the socket was opened. Finally, the "In Time" 407 and "Out Time" 408 indicators show the time of the last transaction processed on each socket by the gateway API server. The difference in these two times is the processing time on the transaction processor's network and the associated external network (Visa, MasterCard, Amex). The "refresh" button 440 is provided to update the screen 400 as this is a static "SnapShot" in time.

The final function that is available from the on the gateway API is the "Clear Stats" operation. If the "Clear Stats" operations is selected from a pull down menu (not shown), all the counters in the gateway API are initialized to their starting values. This is useful during system integration and testing.

HTTP Interface

The gateway API's HTTP interface serves two purposes. First, the HTTP interface provides a mechanism to remotely view the current transactional statistics on the gateway API server. This was done to enable remote monitoring of the gateway API server from anywhere within the merchant's domain. Anyone that has network access to the server will be able to retrieve this statistical information. The General and NOVALink Statistics section in the Web Browser directly correspond with those on the gateway API server.

Figure 5:
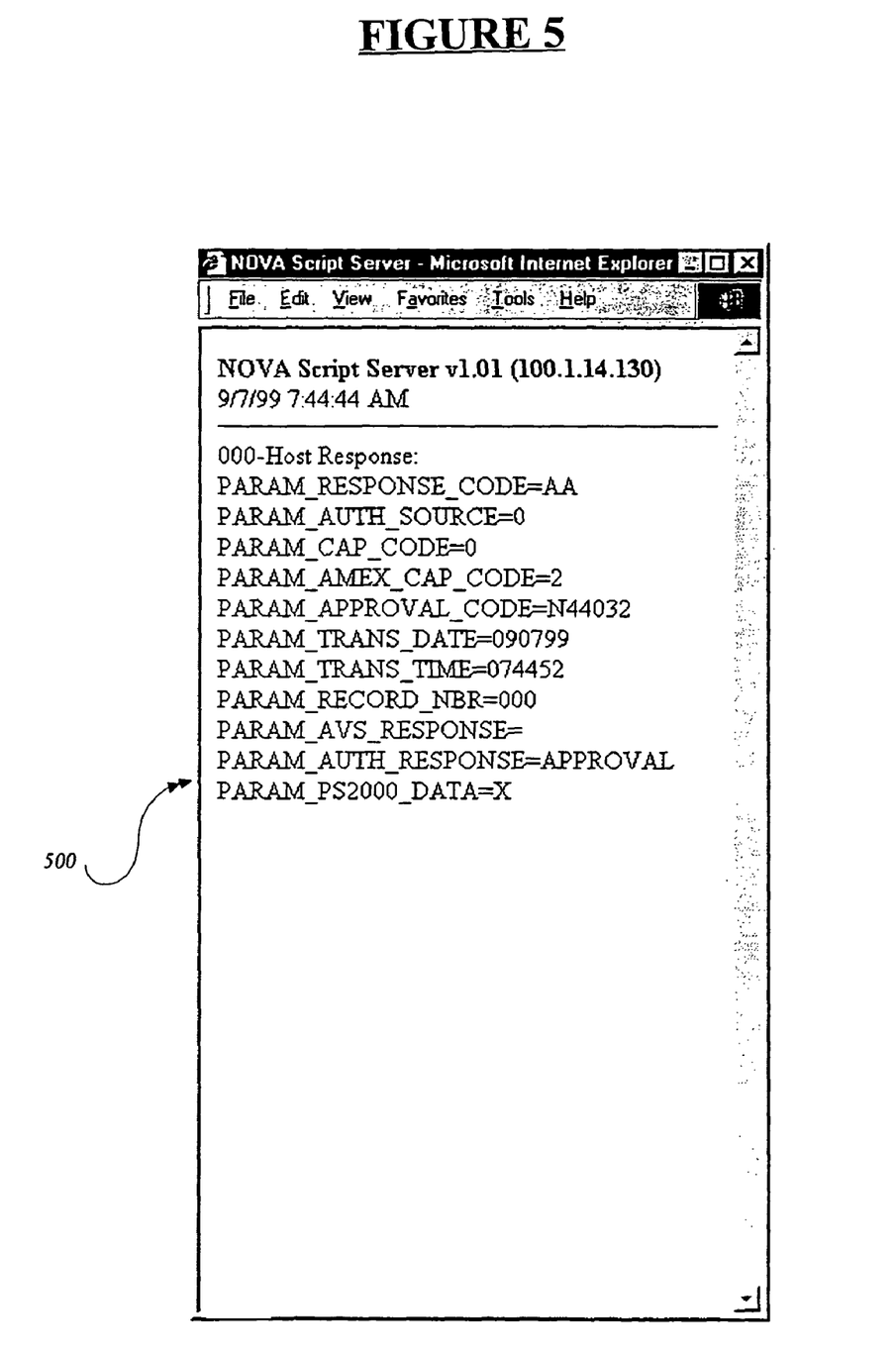
FIG. 5 is a drawing of an HTTP interface window according to a preferred embodiment of the present invention.
Figure 6:
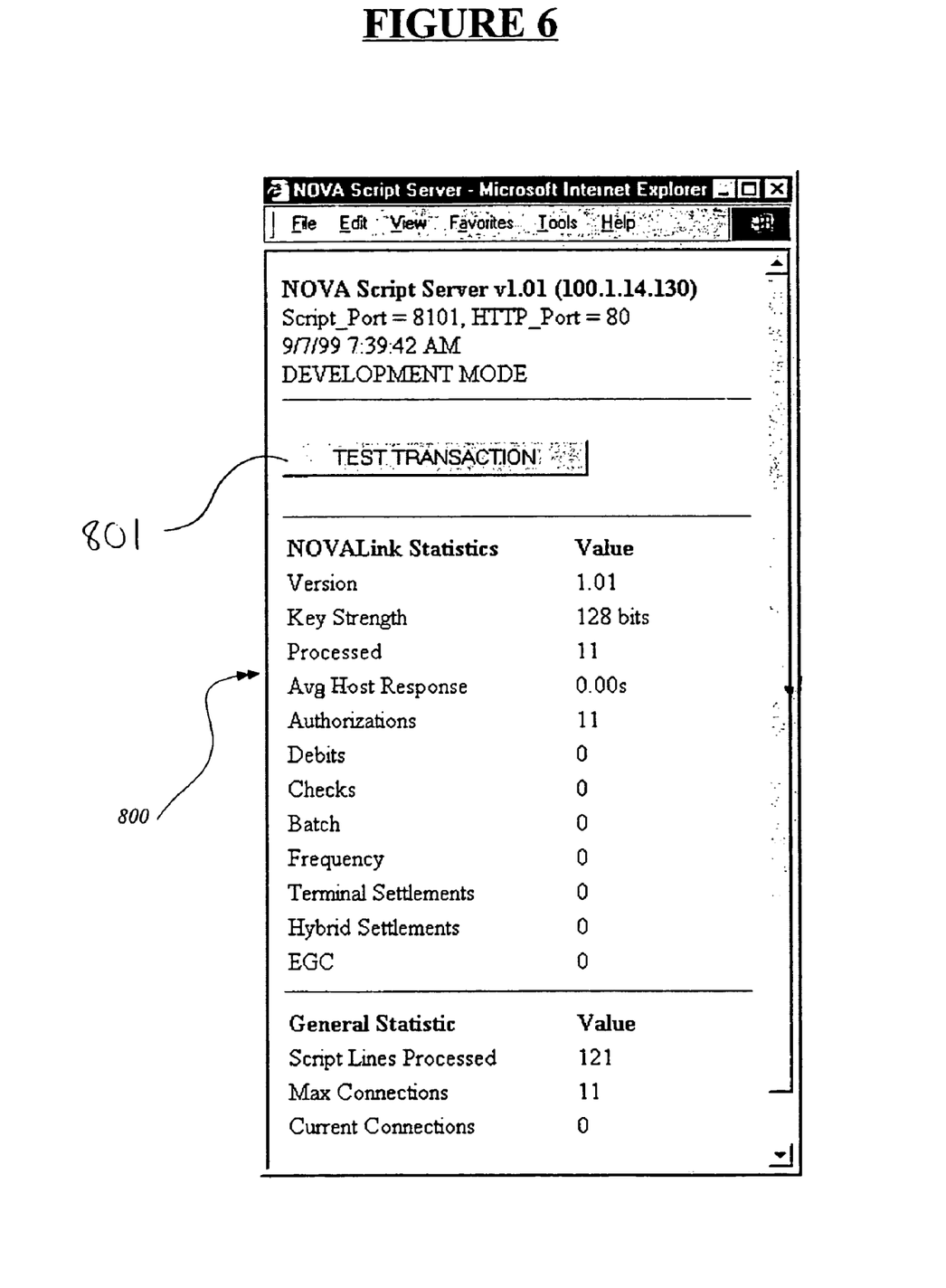
FIG. 6 is a drawing of a test window according to a preferred embodiment of the present invention.

Also, a "test transaction" button 801, as shown in the window 800 of FIG. 6, has been added to enable the sending of a "canned" test transaction to the transaction processor's network. In this way, one can test the end-to-end connectivity between the gateway API server and the transaction processor's network via the Internet. The "canned" transaction will be recognized by the transaction processor's hosts as a test transaction and be thrown away once answered. An example of the response from a canned transaction is shown the HTTP interface window 500 of FIG. 5. The canned transactions should always give an "approved" transaction.

The embodiment described above functions as a gateway that connects the merchant's network to a transaction processing network. Although the above embodiment is an improvement over prior art gateway products, a still further improvement may be realized by "moving" the transaction gateway computer 124 from the merchant's network to the server farms 200, 300 at the positions occupied by transaction gateway computers 124' as shown in FIG. 1. In this scheme, the merchant computer 122 simply sends the same ASCII transaction message to the transaction gateway computers 124' via a secure socket layer (SSL) connection over the Internet. The transaction gateway computers 124' are modified to accept the message from the merchant computer 122 in an encrypted format, unencrypt the message and transmit the message to a server 210, 310 via the firewall 142, 144. This arrangement still allows a merchant to send a simple ASCII message over an Internet (SSL) connection, but allows this to be accomplished without the need for maintaining a separate transaction gateway computer 124 at the merchant's (or the merchant's ISP provider's) site.

Another preferred embodiment involves a single user computer 510 as shown in FIG. 1. The single user computer 510 may be particularly applicable in small business situations, such as the receptionist's desk in a doctor's office. The software running on computer 510 comprises two portions. A first portion consists of a gateway API similar to the one that runs on the gateway computer 124, with the appropriate modifications to accept input from the second portion of the software rather than for a separate merchant computer. The first portion accepts an ASCII message (which need not be formatted because it will come from the second portion of the software running on the same physical machine), translates the ASCII message into the appropriate message spec, encrypts the translated message and transmits it via the Internet to the externally reachable servers 224a,b, 324a,b. The second portion of the software running on the computer 510, which may be supplied by the merchant, constitutes the operator interface (in whatever form is desired by the merchant) and the code necessary to construct the ASCII message which is to be transferred to the first portion of the software.

Another preferred embodiment 701 involves a network 703 to which a number of user terminals 702 and a transaction gateway computer 700 are attached. This embodiment is believed to be particularly applicable to a telemarketing operation in which many operators are present at a single physical location and are processing "card not present" transactions. Each terminal 702 are configured with a web browser program (e.g., Microsoft Internet Explorer), which is pointed at a user interface application resident on the terminal (which is different from the traditional situation in which the terminal logs onto a host computer). The user interface application cues a user such as a telemarketer to enter the required information and then constructs an ASCII message, which is then sent in un-encrypted form (because the network 703 is trusted/secure) to the gateway transaction computer 700. It should be noted that the user interface application may be simplified if used in a situation where only "card not present" transactions are to be processed. The gateway transaction computer 700 again performs a similar functions to the gateway transaction computer 124 in addition to interfacing with the web-browserable user interface application on the terminals 702 to accept the ASCII message. The gateway computer 124 may batch several transactions from multiple terminals 702. One feature of this embodiment is that all transactions appear to the bank or third party aggregator to originate from the same terminal.

Yet another embodiment involves a plurality of remote terminals 601, which preferably comprise notebook personal computers, connected to a gateway transaction computer 600 by dial-in connections over the PSTN (public switched telephone network). The embodiment is believed to be particularly applicable to a company employing traveling salesmen. Each salesman may carry a portable computer 601, which runs a user interface application in any number of formats preferably specified and/or supplied by the merchant. The user interface application constructs an ASCII message and transmits the message over the PSTN to gateway computer 600. It should be noted that no encryption is necessary as the same level of security is provided by prior art POS terminals discussed above that send unencrypted transaction information to bank computers over the PSTN. The gateway computer 600 inputs the ASCII message from the PSTN, translates it into the desired message spec, encodes the translated message, and transmits it to a server 224a,b, 324a,b via the Internet. This configuration allows traveling salesmen to call in transactions to the "home office" as necessary from any convenient phone line.

While the invention has been described in detail in connection with the preferred embodiments known at the time, it should be readily understood that the invention is not limited to such disclosed embodiments. Rather, the invention can be modified to incorporate any number of variations, alterations, substitutions or equivalent arrangements not heretofore a described, but which are commensurate with the spirit and scope of the invention. Accordingly, the invention is not to be seen as limited by the foregoing description, but is only limited by the scope of the appended claims.

What is claimed is:

1. A method for processing credit card transactions comprising the steps of:
   accepting, by a gateway computer, a transaction message in ASCII form;
   translating, by the gateway computer, the transaction message into a message format accepted by a credit card transaction processing computer;
   encrypting, by the gateway computer, the translated transaction message; and
   transmitting, by the gateway computer, the encrypted message to a credit card transaction processing computer.

2. The method of claim 1, wherein the encrypted message is transmitted through the Internet.

3. The method of claim 1, further comprising the step of establishing a primary socket connection to the credit card processing computer through the Internet, wherein the transmitting step is performed by transmitting the encrypted message to the credit card transaction processing computer through the socket connection.

4. The method of claim 3, further comprising the steps of:
   establishing at least one redundant socket connection to at least one redundant transaction processing computer; and
   transmitting, by the gateway computer, the encrypted message to the redundant transaction processing computer via the redundant socket connection if the primary socket connection fails.

5. The method of claim 4, wherein the redundant transaction processing computer and the primary transaction processing computer are in geographically remote locations.

6. The method of claim 1, wherein the encryption step includes the step of exchanging public and private keys with the transaction processing computer.

7. A system for processing credit card transactions, the system comprising:
   a merchant computer, said merchant computer configured to receive payment information;
   and a transaction gateway computer, said transaction gateway computer being connected to the merchant computer, said transaction gateway computer being configured to perform the steps of:
   accepting a transaction message from the merchant computer in ASCII form;
   translating the transaction message into a message format accepted by a credit card transaction processing computer;
   encrypting the translated transaction message; and
   transmitting the encrypted message to a credit card transaction processing computer.

8. The system of claim 7, wherein the encrypted message is transmitted through the Internet.

9. The system of claim 7, wherein the transaction gateway computer is further configured to perform the step of establishing a primary socket connection to the credit card processing computer through the Internet, and wherein the transmitting step is performed by transmitting the encrypted message to the credit card transaction processing computer through the socket connection.

10. The system of claim 9, wherein the transaction gateway computer is further configured to perform the steps of:
    establishing at least one redundant socket connection to at least one redundant transaction processing computer; and
    transmitting the encrypted message to the redundant transaction processing computer via the redundant socket connection if the primary socket connection fails.

11. The system of claim 10, wherein the redundant transaction processing computer and the primary transaction processing computer are in geographically remote locations.

12. The system of claim 7, wherein the encryption step includes the step of exchanging public and private keys with the transaction processing computer.

13. A method for transmitting a credit card transaction to a bank computer comprising the steps of:
    forming, by a merchant computer, a transaction message in ASCII form;
    transmitting, by the merchant computer, the ASCII message to a gateway transaction computer in unencrypted form over a secure network;
    translating, by the gateway transaction computer, the ASCII message to a message specification required by a third party aggregator at the gateway transaction computer;
    encrypting, by the gateway transaction computer, the translated message;
    transmitting, by the gateway transaction computer, the encrypted message to a third party aggregator computer via the Internet;
    transmitting the contents of the encrypted message to a bank computer from the third party aggregator computer.

14. The method of claim 13, further including the step of providing a user interface that is viewable with a web browser at the merchant computer, the user interface being configured to perform the forming step based on input from a user.

* * * * *